Patented Apr. 23, 1935

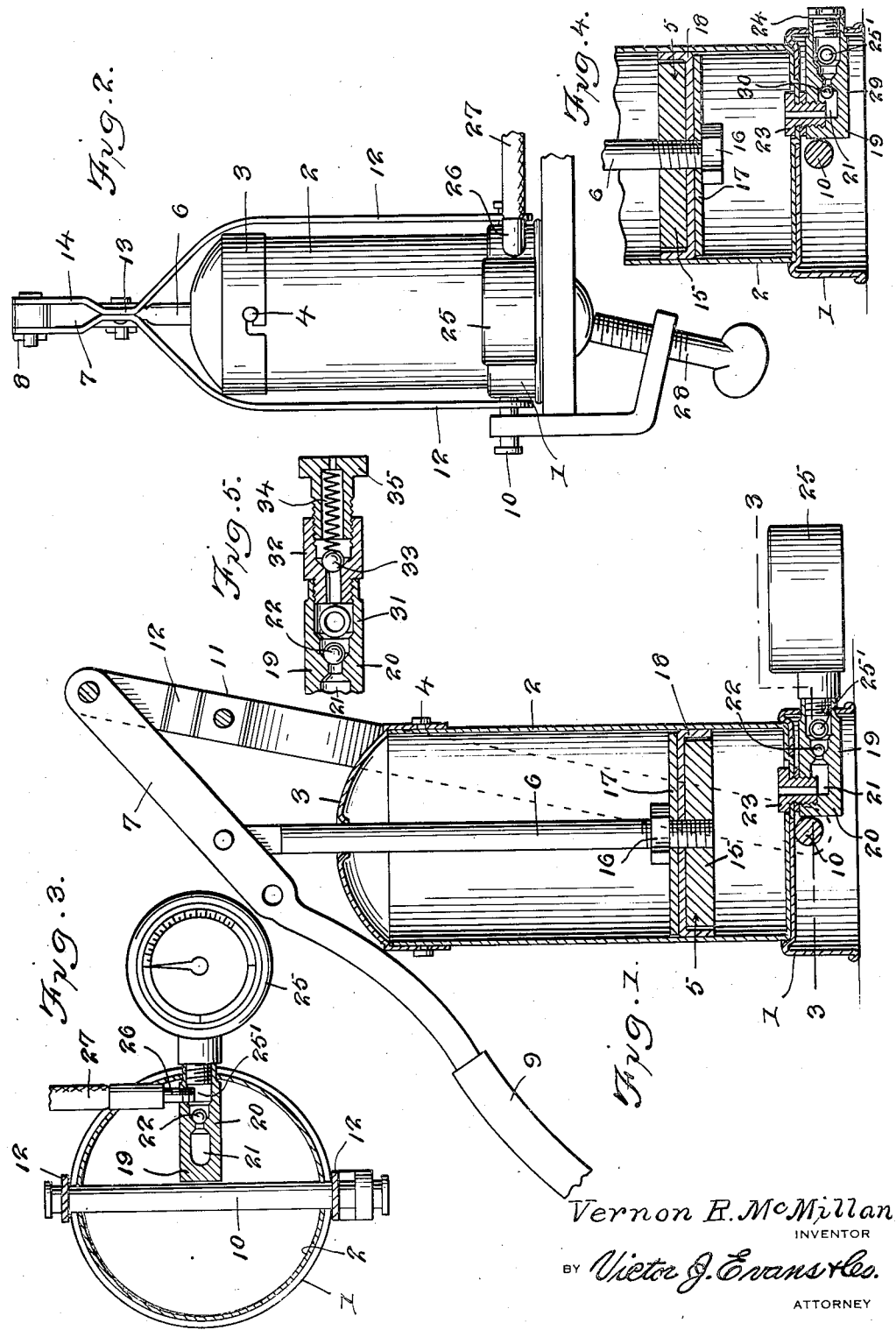

1,998,903

UNITED STATES PATENT OFFICE 1,998,903

TABLE AIR PUMP

Vernon R. McMillan, Terre Haute, Ind.

Application March 19, 1934, Serial No. 716,400

3 Claims. (Cl. 230—190)

This invention relates to pumps and has for the primary object the provision of a device of this character which is of a portable and durable construction and may be easily operated and is especially adapted for inflation purposes or may be readily converted for suction purposes to develop partial vacuums in devices.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a pump constructed in accordance with my invention and arranged for inflation purposes.

Figure 2 is a side elevation illustrating the mounting of the pump to a support.

Figure 3 is a sectional view taken on the line 3—3 of Figure 1.

Figure 4 is a fragmentary vertical sectional view illustrating a pump inverted for suction purposes.

Figure 5 is a detail sectional view illustrating an adapter for the pump so as to release pressure when it exceeds a predetermined amount.

Referring in detail to the drawing, the numeral 1 indicates a substantially cup-shaped base for supporting a cylinder 2. The base 1 when in use is inverted and a wall thereof is offset to form a depression for the reception of the lower end of the cylinder, which end is fixed in any suitable manner to the base. The upper end of the cylinder is closed by a removable cap 3 secured to the cylinder, as shown at 4. Operating within the cylinder 2 is a piston 5, the stem 6 thereof extending through an opening in the cap 3 and has its upper end pivoted to an operating lever 7 by a removable pin 8. The lever is equipped with a suitable handle 9 and may be provided with several openings for the reception of the pin 8 whereby the leverage on the piston may be varied. Extending through the base 1 is a rod 10, the ends of which are arranged exteriorly of the base and form journals for the lower end of a pivoted fulcrum 11 and the latter includes members 12 bent to straddle the cylinder and to converge into engagement with each other, as shown at 13, and then bent to form spaced portions 14 which straddle the end of the lever 7 and are pivoted to said end. The piston 5 consists of a head 15 threaded to the stem 6 and also threaded to the stem is a nut 16. Interposed between the nut 16 and the head 15 is a disc 17 and a cup-shaped washer 18. The cup-shaped washer 18, as shown in Figure 1, is inverted so that the piston will act to draw air into the cylinder and expel air therefrom by way of a fitting 19.

The base 1 is provided with an opening to receive a fitting 19 and the latter includes a body 20 having a bore 21, a portion of which is restricted to form a valve seat engageable by a ball or check valve 22. The bore 21 opens outwardly through one side of the body and is screw threaded to receive a screw threaded attaching element or plug 23 having a bore therethrough which communicates with the interior of the cylinder. The plug has a head which fits in a recess formed in the bottom of the cylinder and the head protrudes a slight distance above the bottom to prevent lubricant and other matter which may be in the cylinder from readily passing into the bore 21 of the body. The other end of the bore 21 from the plug 23 is internally screw threaded to either receive a plug 24 or a gauge 25. The bore 21 between the check valve and the last-named screw threaded end thereof is provided with a screw threaded port 25' to receive a fitting 26 of a hose or like connecting element 27. The fitting 26 projects into the bore and forms a stop for limiting the movement of the ball valve away from its seat. The valve acts to permit air to pass from the pump under the influence of the piston to the hose connection but will prevent back pressure from the hose connection from entering the cylinder and affecting the piston.

A bracket is journaled to one end of the bar 10 and carries an adjusting bolt 28 to engage with a support, as shown in Figure 2, for the purpose of clamping the pump to the support.

The device described may be employed for many purposes wherein it is desired to build up an air pressure in the device, the operator determining the air pressure by the gauge. However, should the gauge not be needed the body may be closed by the plug 24.

To convert the pump for suction purposes, a fitting 29 is provided similar in construction to the fitting 19 except that the check valve 30 is reverse to that of the check valve 22. In this instance the gauge 25 is removed and the plug 24 is employed. The cup-shaped washer and piston head 15 are reversed on the piston stem 6, as shown in Figure 4. The reciprocation of the pump will draw air into the cylinder from a device connected to the hose consequently establishing in the device a partial vacuum.

The pump may have connected thereto a fitting 31, as shown in Figure 5, which includes the body 20 having threaded thereto an auxiliary body 32. The latter is equipped with a ball valve 33 engaged by a coil spring 34. The coil spring seats against a dented cap or plug 35 which has threaded connection with the auxiliary body. By threading the plug 35 into and away from the auxiliary body 2, the tension of the spring 34 may be varied. The valve 33 is for the purpose of permitting air pressure to escape when said pressure exceeds the strength of the spring 34. As the tension of the spring can be varied, consequently the action of the valve 33 may be changed so that the valve will become unseated at varied air pressures.

Having described the invention, I claim:

1. A pump comprising a cylinder, a piston slidable in the cylinder, means for operating said piston, an inverted cup-shaped base supporting the cylinder and having an opening, a body extending through said opening and having a bore, a check valve in said bore, a plug connecting the body to the cylinder and having a bore in communication with the bore of the body, a hose coupling connected to the bore, said bore having a screw threaded port to receive either a gauge or a plug.

2. A pump comprising a cylinder, a piston slidable in the cylinder, means for operating said piston, an inverted cup-shaped base supporting the cylinder and having an opening, a body extending through said opening and having a bore, a check valve in said bore, a plug connecting the body to the cylinder and having a bore in communication with the bore of the body, a hose coupling connected to the bore, said body having a screw threaded port, an auxiliary body received by said port, a ball check valve in said auxiliary body, and variable spring means carried by said auxiliary body to engage with the ball check valve.

3. A pump comprising a cylinder, a piston slidable in the cylinder, means for operating said piston, a base for supporting the cylinder and having an opening, a body extending through said opening and having a bore, a reversible check valve in said bore, a plug connecting the body to the cylinder and having a bore in communication with the bore of the body, and a hose coupling connected to the bore.

VERNON R. McMILLAN.